United States Patent
Doong et al.

(10) Patent No.: US 11,034,903 B2
(45) Date of Patent: Jun. 15, 2021

(54) ADSORPTION PROCESS FOR TREATING NATURAL GAS

(71) Applicant: UOP LLC, Des Plaines, IL (US)

(72) Inventors: Shain-Jer Doong, Kildeer, IL (US); Mark M. Davis, Highland Park, IL (US); Bhargav C. Sharma, Katy, TX (US)

(73) Assignee: UOP LLC, Des Plaines, IL (US)

( * ) Notice: Subject to any disclaimer, the term of this patent is extended or adjusted under 35 U.S.C. 154(b) by 258 days.

(21) Appl. No.: 16/392,314

(22) Filed: Apr. 23, 2019

(65) Prior Publication Data

US 2020/0002633 A1 Jan. 2, 2020

Related U.S. Application Data

(60) Provisional application No. 62/690,825, filed on Jun. 27, 2018.

(51) Int. Cl.
  *B01D 53/00* (2006.01)
  *C10L 3/10* (2006.01)
  *B01D 53/04* (2006.01)

(52) U.S. Cl.
  CPC .......... *C10L 3/101* (2013.01); *B01D 53/0462* (2013.01); *C10L 3/104* (2013.01); *C10L 3/106* (2013.01); *B01D 2256/24* (2013.01); *B01D 2257/504* (2013.01); *B01D 2257/702* (2013.01); *B01D 2259/40052* (2013.01); *B01D 2259/40067* (2013.01); *B01D 2259/40079* (2013.01); *C10L 2290/08* (2013.01); *C10L 2290/542* (2013.01)

(58) Field of Classification Search
  CPC .......... B01D 2256/24; B01D 2256/245; B01D 2257/504; B01D 2257/702; B01D 2257/80; B01D 2259/40052; B01D 2259/40067; B01D 2259/40079; B01D 53/0462; B01D 53/047; C10L 2290/06; C10L 2290/08; C10L 2290/12; C10L 2290/542; C10L 3/101; C10L 3/104; C10L 3/106
  See application file for complete search history.

(56) References Cited

U.S. PATENT DOCUMENTS

2012/0312163 A1* 12/2012 Leta ...................... B01D 53/526
                                                      95/97
2013/0192299 A1*  8/2013 Dolan .................... C10L 3/101
                                                      62/636

* cited by examiner

*Primary Examiner* — Sharon Pregler
(74) *Attorney, Agent, or Firm* — Paschall & Associates, LLC; Mark Goldberg

(57) ABSTRACT

A process of treating a natural gas stream is provided comprising sending natural gas stream through a first adsorbent bed to remove water and heavy hydrocarbons (C8+) to produce a partially treated gas stream in which the first adsorbent bed is regenerated by a temperature swing adsorption process and then sending the partially treated gas stream through a second adsorption bed to remove carbon dioxide and lighter hydrocarbons (C7−) to produce a purified natural gas stream wherein said second adsorption bed is regenerated by a temperature pressure swing adsorption process.

10 Claims, 3 Drawing Sheets

ADSORPTION PROCESS FOR TREATING NATURAL GAS

This application claims priority from provisional application 62/690,825 filed Jun. 27, 2018 which is incorporated herein in its entirety.

BACKGROUND OF THE INVENTION

Liquefied natural gas (LNG) is natural gas (predominantly methane, $CH_4$, with some mixture of ethane $C_2H_6$) that has been converted to liquid form for ease and safety of non-pressurized storage or transport. It takes up about 1/600th the volume of natural gas in the gaseous state (at standard conditions for temperature and pressure). It is odorless, colorless, non-toxic and non-corrosive. Hazards include flammability after vaporization into a gaseous state, freezing and asphyxia. The liquefaction process involves removal of certain components, such as dust, acid gases, helium, water, and heavy hydrocarbons, which could cause difficulty downstream. The natural gas is then condensed into a liquid at close to atmospheric pressure by cooling it to approximately −162° C. (−260° F.); maximum transport pressure is set at around 25 kPa (4 psi).

Monetization of the abundant supply of natural gas from unconventional shale plays has been primarily focused on large-scale LNG export projects across North America. The aim of these projects is not to supply LNG for domestic markets, but to supply large markets abroad in Europe and Asia. Domestically, the largest use for LNG is for power generation through peak shaving. LNG for peak shaving is usually produced by small-scale liquefaction facilities and peak shaving capacity is focused in the Midwest and the Northeast regions. Although peak shaving capacity is intended to supply extra feed gas to power plants in times of higher demand, some companies are monetizing peak shaving capacity using new business models.

Peak shaving is one of the most common domestic uses for LNG today: Peak shaving is when LNG is stored at a power plant so that in times of peak demand the utility can tap into the LNG in order to increase power output to meet demand spikes. This most often occurs during the winter and summer months when abnormally cold or hot temperatures cause spikes in electricity demand.

There are two types of peak shaving facilities. While both types have on-site LNG storage tanks, one has on-site liquefaction facilities and the other lacks on-site liquefaction capabilities.

In LNG peak shaver plants, thermal swing adsorption (TSA) processes have been widely used for removal of water and carbon dioxide from natural gas to prevent freezing in LNG production. The adsorption beds are typically regenerated by a heated product gas and the spent regeneration gas is then generally returned back to the pipeline as it is difficult to remove carbon dioxide from the spent regeneration gas. For LNG operators other than the peak shavers, returning the spent regeneration gas back to the pipeline may not be an option to them. There is a desire for them to reduce the spent regeneration gas and/or to find a use for the spent regeneration such as a fuel.

There are closed loop or semi-closed loop heating cycles that can be used to reduce the spent regeneration gas amount by recirculating the spent regeneration gas to the inlet of the adsorbent bed that is being regenerated. These cycles tend to be less efficient as they do not regenerate the adsorber as completely as a normal open loop temperature swing adsorption process that would use a relatively clean gas to desorb impurities from the bed. Because both heating and cooling loops are separate in these systems, they also suffer a disadvantage of more equipment required for the regeneration circuit.

A hybrid regeneration process such as a thermal or temperature pressure swing adsorption (TPSA) process can also be used to facilitate bed regeneration by lowering the adsorbent bed pressure. However, as the pressure is reduced, the heat input carried by the low pressure regeneration gas is also reduced, which makes the thermal regeneration less effective.

There is still a need to develop a better adsorption process for water, CO2 and hydrocarbon removal with a reduced spent regeneration gas.

SUMMARY

The invention provides a process of treating a natural gas stream comprising sending the natural gas stream through a first adsorbent bed to remove water and heavy hydrocarbons (C8+) to produce a partially treated gas stream. The first adsorbent bed is regenerated by a temperature swing adsorption process. Then the partially treated gas stream is sent through a second adsorption bed to remove carbon dioxide and lighter hydrocarbons (C7−) to produce a purified natural gas stream. This second adsorption bed is regenerated by a temperature pressure swing adsorption process which uses both increased temperature and pressure to desorb the impurities during regeneration steps of the process.

DETAILED DESCRIPTION OF THE INVENTION

This invention combines some key features of temperature swing adsorption and pressure swing adsorption processes to reduce the spent regeneration gas from the temperature pressure swing adsorption process of the present invention. These features are discussed below.

An adsorbent bed is used to remove impurities such as water and carbon dioxide from natural gas. Periodically, it is necessary to regenerate the adsorbent bed which is typically done by passing a heated regeneration gas through the adsorbent bed resulting in desorption of the impurities. The most efficient desorption is accomplished by passing a clean gas stream such as a product stream through the bed. However, that tends to reduce the amount of product gas. It was found years ago that closed loop or semi-closed loop heating of a spent regeneration gas can be used to conserve the amount of product gas used. This concept was disclosed in 1977 by UOP in U.S. Pat. No. 4,028,069. Reusing the spent regeneration gas cuts down the loss of the net spent regeneration gas. In the semi-closed loop case, only a portion of the spent regeneration is recycled. However, the concept of closed loop or semi-closed loop only works for those contaminants that are not very strongly adsorbed on the adsorbents. Adsorption of carbon dioxide, hydrogen sulfide and lighter hydrocarbons (C7−) on molecular sieves fit into this category. However for impurities such as water and heavy hydrocarbons (C8+), closed-loop heating is not suitable due to their being more strongly adsorbed. In order to be able to thoroughly treat the gas stream it has now been found that the desired result can be achieved by using a front end temperature swing adsorption (TSA) unit to remove water and heavy hydrocarbons and followed with the new temperature pressure swing adsorption (TPSA) process to remove carbon dioxide and lighter hydrocarbons. The front end TSA unit will be similar to UOP LLC's SeparSIV or MemGuard processes. The SeparSIV process is based on the principle that adsorbents are capable of selectively adsorbing impurities. The impurities are adsorbed at low temperatures in a fixed-bed adsorber and desorbed by "swinging" the adsorbers from feed gas temperature (low) to regeneration temperatures (high) with hot regeneration gas. Furthermore, with the proper portfolio of adsorbents, multiple impurities can be removed and recovered within a single system. Typically, the treated gas remains close to feed gas pressure and the hydrocarbons and water are recovered as liquids during regeneration. This compares to the MemGuard process.

Figure 1:
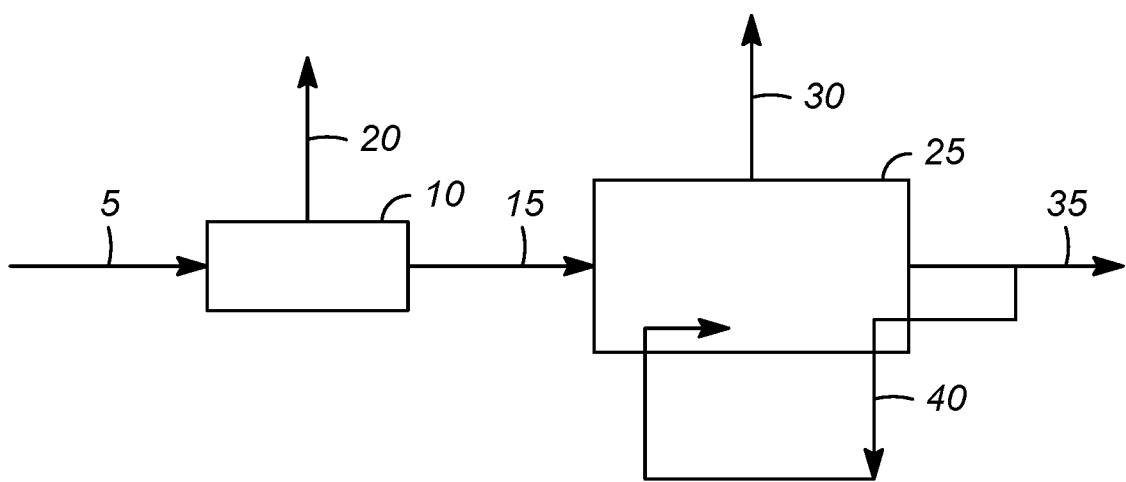
FIG. 1 shows a flow scheme of a natural gas stream passing first through a temperature swing unit followed by passing through a temperature pressure swing adsorption unit.

FIG. 1 illustrates this concept. In the TPSA process, there is a low pressure purge. In this invention, closed-loop or semi-closed heating is done at a high pressure to ensure the effectiveness of the thermal regeneration. After the closed-loop regeneration, the adsorber is depressurized and purged with a clean gas similar to a conventional PSA process. If necessary, hot purge gas can be used as in a conventional TPSA process.

Co-current depressurization is used to minimize the loss of spent regeneration gas from blowdown due to bed depressurization, the effluent gas from a co-current depressurization step is used to purge another bed. In this case there is no need for a distinctive cooling step. In this invention, the bed can be somewhat cooled by the use of purge and repressurization gas, so a dedicated cooling step as in a typical TSA process can be omitted. The bed can be completely cooled with feed gas simultaneously withdrawing product.

The invention provides an adsorption-based process to remove water, carbon dioxide and hydrocarbons in a minimum of two units for liquefied natural gas pretreatment. For gas streams that have less than 3% carbon dioxide, this process offers a cost advantage compared to a currently marketed process that combines an amine solvent absorption with a dehydration-heavy hydrocarbon adsorption combination.

Figure 2:
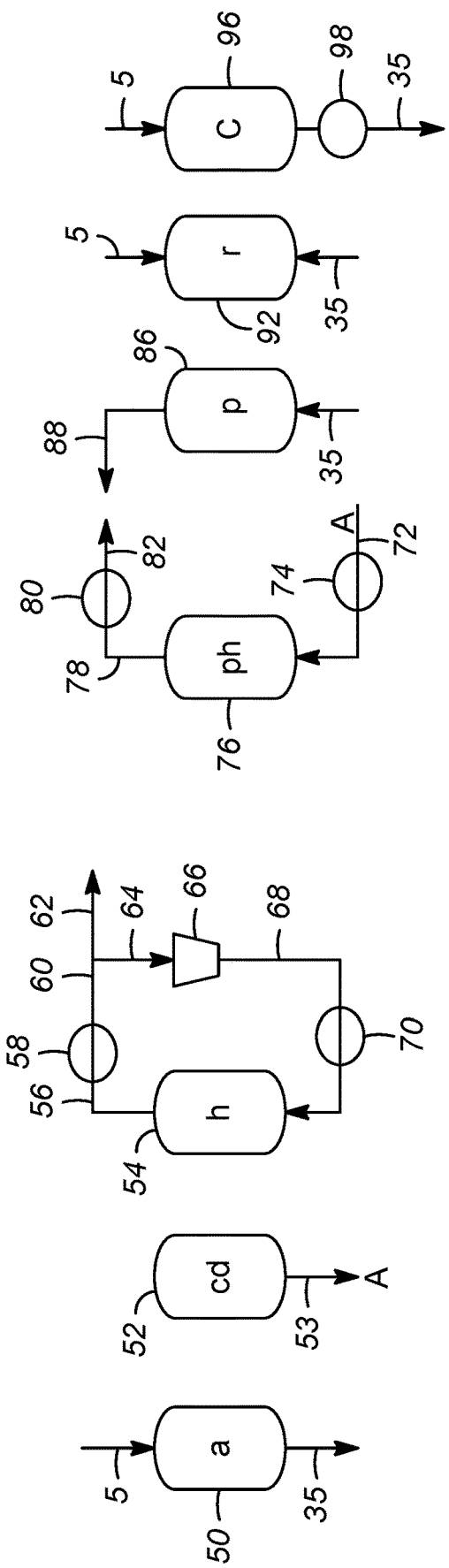
FIG. 2 is an illustration for bed A of Table 1 showing a temperature pressure swing adsorption unit undergoing a complete cycle.

FIG. 2 shows one of the possible PTSA cycles that can be implemented for carbon dioxide and light hydrocarbons removal from a natural gas stream. This example is a 4-bed system with different cycle steps illustrated in Table 1. Each step is denoted as follows:
  a: adsorption with feed and product
  cd: co-current depressurization
  h: closed-loop heating
  ph: purge with heating
  p: purge without heat
  r: repressurization
  c: cooling with feed and withdrawing product FIG. 1 shows a flowscheme for removal of water, carbon dioxide and heavy hydrocarbons using an adsorption system. A gas stream 5 is first sent to a temperature swing adsorption unit 10 to remove water, heavy hydrocarbons (C8+ and aromatics such as benzene, toluene and xylene). A partially purified gas stream 15 is sent to a pressure temperature swing adsorption unit 25 to remove a gas stream 30 that contains carbon dioxide and lighter hydrocarbons (C7−).

Gas stream 30 may be used as a fuel gas. A product stream 35 comprising mainly methane is shown with a portion 40 of product stream 35 is recycled as a regeneration gas stream.

FIG. 2 shows one embodiment of the invention showing some of the steps involved in the pressure temperature swing adsorption process with the cycle that is shown in Table 1. A gas stream 5 is sent to an adsorbent bed 50 in adsorbing mode to produce product 35. There is cocurrent pressurization shown at 52 with a pressurized stream 53 produced for use in the process. A closed loop heating process is shown with adsorbent bed 54 with a stream 68 sent to heater 70 and a stream 56 exiting to pass through cooler 58 with stream 60 being split into stream 62 and stream 64 sent through blower 66. The next phase that is shown in FIG. 2 is a purge with heating to adsorbent bed 76 with a stream 72 to be heated by heater 74 and then exiting as stream 78 to be cooled by cooler 80 with spent stream 82 shown. Next is shown product stream 35 entering adsorbent bed 86 for a purge without heat to produce stream 88. Finally, a feed stream 5 is sent through a cooled bed 96 with the product stream 35 having been cooled by cooler 98.

Figure 3:
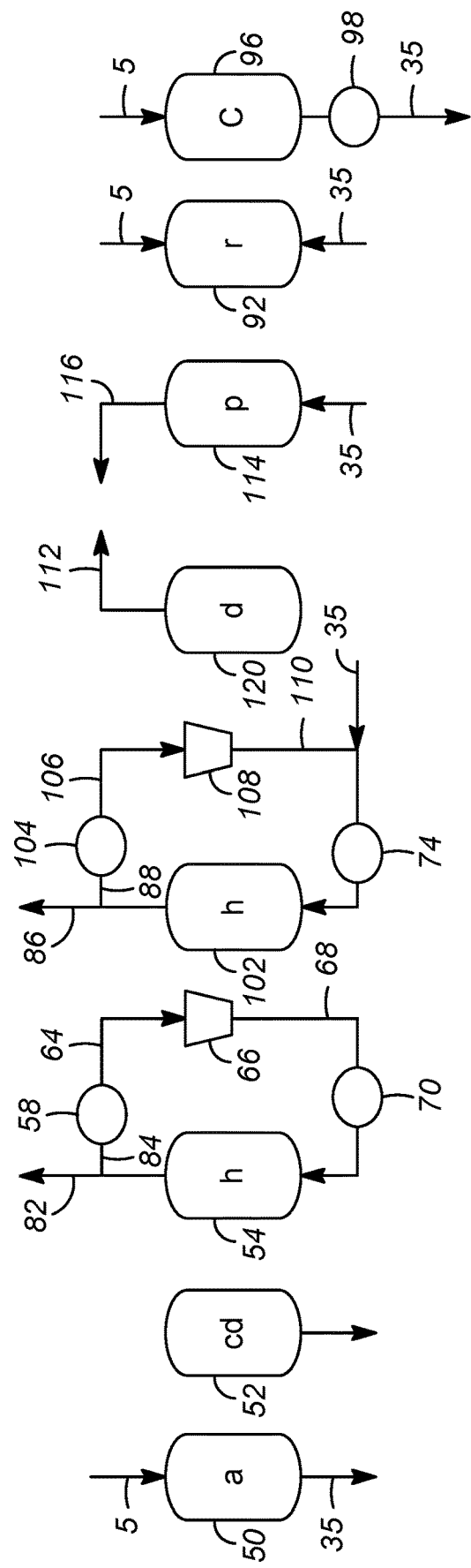
FIG. 3 shows one full cycle for bed A in a temperature pressure swing adsorption cycle shown in Table 2

Table 2 shows another possible PTSA cycle that can be implemented for CO2 and light hydrocarbons removal from a natural gas stream. This cycle is suited for a low pressure purge where an extended time is needed to repressurize and depressurize the adsorbers. In addition to co-current depressurization step, a depressurization (d) step is added to further decrease the bed pressure after s semi closed-loop heating (oh). A semi closed-loop heating is similar to the closed-loop heating except that more spent regeneration gas is taken out of the system with make-up from the product gas. FIG. 3 shows a complete full cycle for bed A of Table 2, where a semi closed-loop step is shown after the closed-loop heating step.

FIG. 3 shows the steps that are involved in the cycles of adsorbent bed A in Table 2. A gas stream 5 passes through adsorbent bed 50 with product stream 35 produced. The next step is a co-current depressurization shown at 52. Next is shown a closed-loop heating with adsorbent beds 54 and 102 shown in a different configuration from FIG. 2. A gas stream 68 is heated by heater 70 to pass through adsorbent bed 54 with a portion 82 of the resulting stream as a spent stream and a portion 84 recycling through cooler 58 to stream 64 to blower 66 to gas stream 68. Similarly, a portion 86 of the resulting stream from bed 102 is sent as a spent stream and a portion 88 through cooler 104 to stream 106 to blower 108 and stream 110. A portion of product stream 35 enters and is combined with stream 110 to dilute the impurities removed from the adsorbent beds and then is heated by heater 74 to pass through adsorbent bed 102. Next shown is adsorbent bed 120 in depressurization mode to remove impurities in spent stream 112. Next is shown adsorbent bed 114 with product stream 35 entering as a purge stream and then regeneration stream 116. A product stream 35 passes through adsorbent bed 92 in repressurization mode and feed 5 is shown entering as well. Finally, feed 5 enters adsorbent bed 96 to cooler 98 to product stream 35.

TABLE 1

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| bed A | a | a | a | a | a | a | cd | h | h | h | ph | ph | ph | p | p | p | p | r | c | c | c | c | c | c |
| bed B | c | c | c | c | c | c | a | a | a | a | a | a | cd | h | h | h | ph | ph | ph | p | p | p | p | r |
| bed C | ph | p | p | p | p | r | c | c | c | c | c | c | a | a | a | a | a | a | cd | h | h | h | ph | ph |
| bed D | cd | h | h | h | ph | ph | ph | p | p | p | p | r | c | c | c | c | c | c | a | a | a | a | a | a |

TABLE 2

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| bed A | a | a | a | a | a | a | cd | h | h | h | oh | d | ph | p | p | p | r | r | c | c | c | c | c | c |
| bed B | c | c | c | c | c | c | a | a | a | a | a | a | cd | h | h | h | oh | d | ph | p | p | p | r | r |
| bed C | ph | p | p | p | r | r | c | c | c | c | c | c | a | a | a | a | a | a | cd | h | h | h | oh | d |
| bed D | cd | h | h | h | oh | d | ph | p | p | p | r | r | c | c | c | c | c | c | a | a | a | a | a | a |

SPECIFIC EMBODIMENTS

While the following is described in conjunction with specific embodiments, it will be understood that this description is intended to illustrate and not limit the scope of the preceding description and the appended claims.

A first embodiment of the invention is a process of treating a natural gas stream comprising sending the natural gas stream through a first adsorbent bed to remove water and heavy hydrocarbons (C8+) to produce a partially treated gas stream wherein the first adsorbent bed is regenerated by a temperature swing adsorption process and; sending the partially treated gas stream through a second adsorption bed to remove carbon dioxide and lighter hydrocarbons (C7−) to produce a purified natural gas stream wherein the second adsorption bed is regenerated by a temperature pressure swing adsorption process. An embodiment of the invention is one, any or all of prior embodiments in this paragraph up through the first embodiment in this paragraph wherein the natural gas stream comprises less than about 3 vol % carbon dioxide. An embodiment of the invention is one, any or all of prior embodiments in this paragraph up through the first embodiment in this paragraph wherein a closed loop or semi-closed loop regeneration gas stream is used to regenerate the first adsorbent bed. An embodiment of the invention is one, any or all of prior embodiments in this paragraph up through the first embodiment in this paragraph wherein a semi-closed loop regeneration gas stream is used to regenerate the first adsorbent bed. An embodiment of the invention is one, any or all of prior embodiments in this paragraph up through the first embodiment in this paragraph wherein the temperature pressure swing adsorption process comprises a series of steps in order comprising adsorption, co-current depressurization, closed-loop heating, a purge with heating, a purge without heating, repressurization of the adsorbent bed and cooling with feed and then withdrawal of product. An embodiment of the invention is one, any or all of prior embodiments in this paragraph up through the first embodiment in this paragraph wherein the temperature pressure swing adsorption process comprises a series of steps in order comprising adsorption, co-current depressurization, a first closed loop heating step and a second closed loop heating step, a depressurization step, a purge without heat, repressurization and cooling with feed and withdrawal of product. An embodiment of the invention is one, any or all of prior embodiments in this paragraph up through the first embodiment in this paragraph wherein a portion of the product is used in the purge without heating step. An embodiment of the invention is one, any or all of prior embodiments in this paragraph up through the first embodiment in this paragraph wherein a portion of the product stream is heated and sent through the adsorbent bed. An embodiment of the invention is one, any or all of prior embodiments in this paragraph up through the first embodiment in this paragraph wherein a stream exiting the adsorbent bed is sent into the adsorbent bed or into a second adsorbent bed. An embodiment of the invention is one, any or all of prior embodiments in this paragraph up through the first embodiment in this paragraph wherein the heating step is at an increased pressure.

The invention claimed is:

1. A process of treating a natural gas stream comprising
   sending said natural gas stream through a first adsorbent bed to remove water and heavy hydrocarbons (C8+) to produce a partially treated gas stream wherein said first adsorbent bed is regenerated by a temperature swing adsorption process; and
   sending said partially treated gas stream through a second adsorption bed to remove carbon dioxide and lighter hydrocarbons (C7−) to produce a purified natural gas stream wherein said second adsorption bed is regenerated by a temperature pressure swing adsorption process.

2. The process of claim 1 wherein said natural gas stream comprises less than about 3 vol % carbon dioxide.

3. The process of claim 1 wherein a closed loop or semi-closed loop regeneration gas stream is used to regenerate said second adsorbent bed.

4. The process of claim 3 wherein a semi-closed loop regeneration gas stream is used to regenerate said second adsorbent bed.

5. The process of claim 1 wherein said temperature pressure swing adsorption process comprises a series of steps in order comprising adsorption, co-current depressurization, closed-loop heating, a purge with heating, a purge without heating, repressurization of the adsorbent bed and cooling with feed and then withdrawal of product.

6. The process of claim 1 wherein said temperature pressure swing adsorption process comprises a series of steps in order comprising adsorption, co-current depressurization, a first closed loop heating step and a second closed loop heating step, a depressurization step, a purge without heat, repressurization and cooling with feed and withdrawal of product.

7. The process of claim 5 wherein a portion of said product is used in said purge without heating step.

8. The process of claim 6 wherein a portion of said product stream is heated and sent through said adsorbent bed.

9. The process of claim 8 wherein a stream exiting said adsorbent bed is sent into said adsorbent bed or into a second adsorbent bed.

10. The process of claim 5 wherein said heating step is at a higher pressure than said purge step.

* * * * *